(12) United States Patent
Paulson

(10) Patent No.: US 7,300,074 B1
(45) Date of Patent: Nov. 27, 2007

(54) ELBOW FITTING WITH STEP FEATURE FOR PNEUMATIC TRANSPORT SYSTEM

(75) Inventor: Jerome I. Paulson, Millersville, PA (US)

(73) Assignee: Pelletron Corporation, Lancaster, PA (US)

( * ) Notice: Subject to any disclaimer, the term of this patent is extended or adjusted under 35 U.S.C. 154(b) by 376 days.

(21) Appl. No.: 11/117,980

(22) Filed: Apr. 29, 2005

Related U.S. Application Data

(63) Continuation-in-part of application No. 10/743,117, filed on Dec. 22, 2003, now Pat. No. 6,951,354.

(60) Provisional application No. 60/567,954, filed on May 4, 2004.

(51) Int. Cl.
*F16L 43/00* (2006.01)
(52) U.S. Cl. .................. 285/179; 406/193; 406/195
(58) Field of Classification Search ............... 285/179; 406/193, 195
See application file for complete search history.

(56) References Cited

U.S. PATENT DOCUMENTS

| | | | |
|---|---|---|---|
| 4,146,195 A * | 3/1979 | Brooks | 406/190 |
| 4,387,914 A | 6/1983 | Paulson | |
| 4,595,319 A | 6/1986 | Cook | |
| 4,641,864 A * | 2/1987 | Heine et al. | 285/179 |
| 4,733,889 A | 3/1988 | Haines | |
| 4,767,243 A * | 8/1988 | Brannstroom | 406/193 |
| 4,865,353 A * | 9/1989 | Osborne | 285/16 |
| 4,995,645 A | 2/1991 | Pausch | |
| 5,024,466 A | 6/1991 | Brotz | |
| 5,060,984 A * | 10/1991 | Hess | 285/179.1 |
| 5,154,545 A * | 10/1992 | Morimoto et al. | 406/191 |
| 5,288,111 A | 2/1994 | Storf | |
| 6,179,342 B1 * | 1/2001 | Shen | 285/179 |
| 6,443,671 B1 * | 9/2002 | Weiste | 406/195 |
| 6,951,354 B1 * | 10/2005 | Paulson | 285/179 |

FOREIGN PATENT DOCUMENTS

EP    0 195 528 A1 *  2/1986
JP       4-362394    * 12/1992

* cited by examiner

*Primary Examiner*—James M. Hewitt
(74) *Attorney, Agent, or Firm*—Miller Law Group, PLLC

(57) ABSTRACT

An elbow fitting is used in a pneumatic product conveying system in which the fitting expands from the inlet pipe along the outer side of the elbow fitting to enable a layer of accumulated product particles to be formed so as to move at a lower velocity than the velocity of the incoming product stream while establishing a moving contact surface for deflecting incoming product particles toward the outlet pipe with a minimum of pressure resistance and product attrition. The accumulated product particles are discharged from the elbow fitting by incorporating a step in the outer surface of the elbow fitting to create a Bernoulli effect causing the accumulated product particles to enter the air flow after the incoming flow of product particles has ceased. The particles in the accumulated layer are replenished from the incoming flow during operation of the elbow fitting.

14 Claims, 4 Drawing Sheets

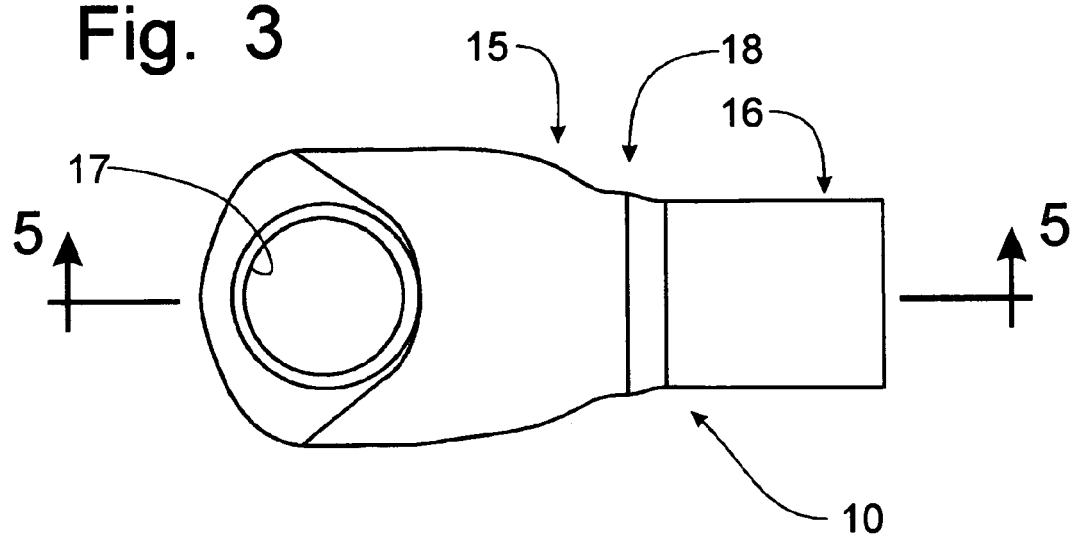
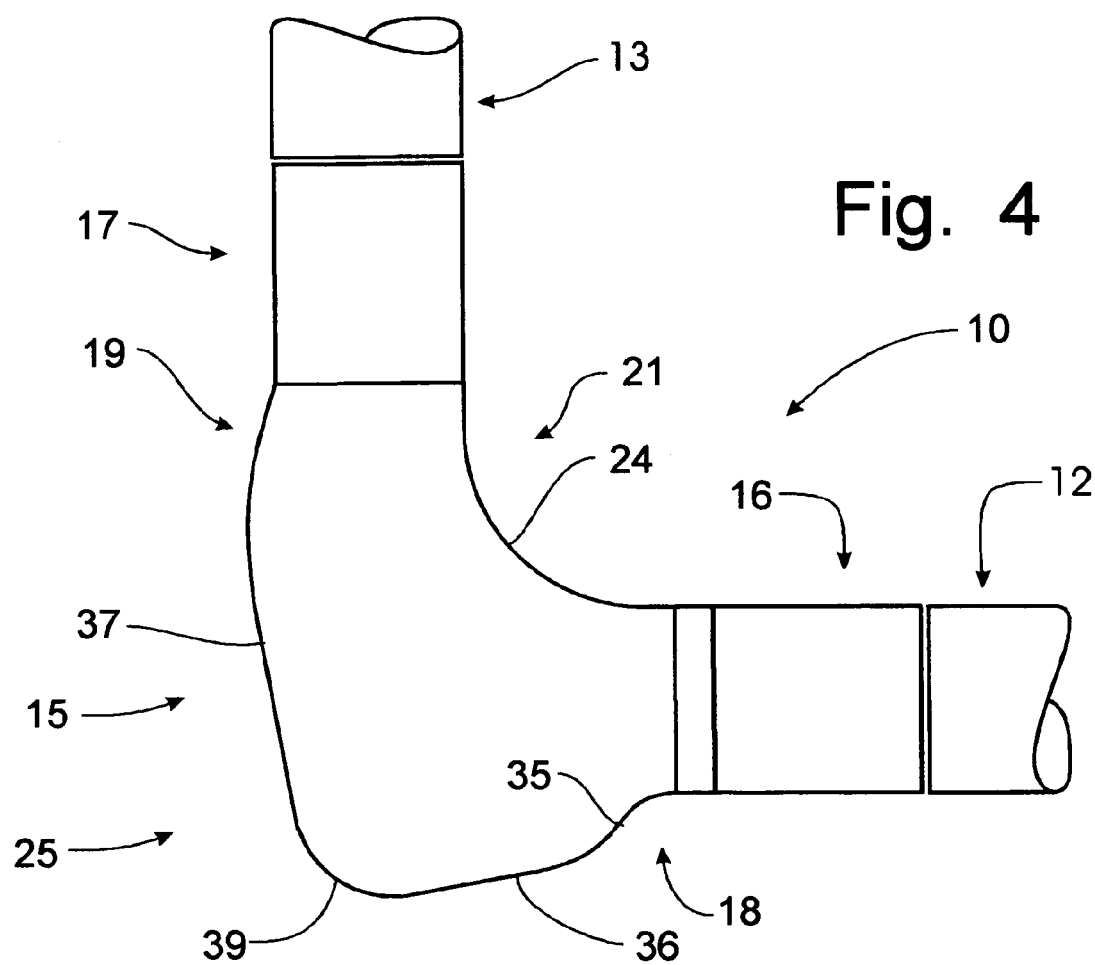

ELBOW FITTING WITH STEP FEATURE FOR PNEUMATIC TRANSPORT SYSTEM

CROSS-REFERENCE TO RELATED APPLICATIONS

This application is a continuation-in-part of U.S. patent application Ser. No. 10/743,117, filed on Dec. 22, 2003, now U.S. Pat. No. 6,951,354. This application also claims domestic priority on U.S. Provisional Patent Application Ser. No. 60/567,954, filed May 4, 2004.

BACKGROUND OF THE INVENTION

The present invention relates generally to pneumatic transport systems and, more particularly, to a fitting for pneumatic pipes to permit a change in direction of the material being conveyed therein.

Conveying solid particles injected into a high velocity stream of air contained within a pipe or tube is well known in industry. Dilute phase velocities often exceed sixty miles per hour and use up to one pound of air to move as much as five pounds of product per minute through the pipe. Typical air pressures for dilute phase systems will range from eight to twelve psig. High air velocity and low product particle population is accomplished with low pressure resistance, but greatly increased damage to the product particles being conveyed. Damage occurs in straight pipe sections, but is greatly increased whenever directional changes are imposed on the conveying system.

Dense phase systems move more product per pound of air, but travel at lower velocities and at higher pressures. Typically, system operating pressures will not exceed forty-five psig. Whether the conveying system is operating under dilute phase or dense phase, the product particles suffer considerable damage during transport, particularly when changes in direction are being used. To effect changes in direction elbow fittings having a radius as much as ten times the diameter of the pipe are used. Nevertheless, the combination of high velocity and centrifugal force does most of the damage, particularly on heat sensitive plastic compounds.

Elbow fittings used in pneumatic conveying systems typically suffer wear at the elbow curve in line with the product flow into the elbow fitting, whether the elbow fitting is a short radius elbow or a long radius sweep elbow fitting. Particles flowing into the elbow fitting impact the curved surface of the elbow and are redirected. The bouncing product particles create an area of turbulence that slows the speed of conveyance of the particles through the system, often causing plugging. Furthermore, the bouncing particles and the movement of the product particles around the outer surface of the elbow fitting generate friction, making the surface of the fitting warm to the touch. This heat can have a detrimental effect on the product being conveyed, particularly when the product is heat sensitive, such as plastic pellets on which the edges of the pellets will melt and adhere to the pipe.

One known attempt to overcome the problem of changing direction in a pneumatic conveying system is found in U.S. Pat. No. 4,387,914, issued to Hammertek Corporation on Jun. 14, 1983. In this Hammertek patent, the elbow fitting is formed with a vortex opening in substantial alignment with the incoming product stream from the straight section of pipe. The vortex section emulates a blocked "T" fitting by providing a chamber in which a loose ball of product particles slowly rotates to deflect incoming product without causing excessive wear on the fitting.

Another known attempt to overcome the aforementioned problems of changing directions in a pneumatic conveying system is taught in U.S. Pat. No. 5,288,111, issued to Waeschle Maschinenfabrik GmbvH on Feb. 22, 1994. IN the Waeschle patent, an angularly disposed baffle plate is positioned within an expanded elbow section that has a greater cross-sectional area than the cross-section of the pipe carrying the incoming product. The expanded elbow cross-section increases in size from the inlet pipe by expanding inwardly toward the inner elbow side. The outer elbow side of the expanding section defines a linear relationship with the inlet pipe to direct the stream of product particles into engagement with the baffle plate that is oriented at between 55 and 65 degrees with respect to the axis of the inlet pipe. Accordingly, the expanded elbow cross-section is not intended to provide a flow of material along the outer side of the elbow fitting. Excessive wear on the baffle plate is, therefore, incurred due to the direct impact with the incoming product stream.

Other deflector plate elbow fittings for pneumatic conveying systems are taught in U.S. Pat. No. 4,595,319, issued to Richard H. Cook for Cubeco, Inc. on Jun. 17, 1986; and in U.S. Pat. No. 4,733,889, issued to Edwin L. Haines for The Goodyear Tire and Rubber Company on Mar. 29, 1988. Both patents provide for an expanded elbow cross-section in conjunction with the obliquely arranged deflector plate or corresponding linear deflecting portion of the elbow outer side. In U.S. Pat. No. 4,606,556, issued to Robert E. Metzger for Fuller Company on Aug. 19, 1986, a stepped deflector plate is positioned at the outer elbow side to provide for a reduced wear elbow fitting. As the steps or ribs wear, the extra thickness of the material will permit a longer life for the fitting. In U.S. Pat. No. 4,995,645, issued to Josef Pausch for General Resource Corporation on Feb. 26, 1991, an open expanded area at the impact zone for the incoming particles is provided to create an accumulation of product in alignment with the incoming stream of product particles. The elbow section is expanded with a flare at 15 degrees to provide improved product flow after impacting the accumulated material.

In U.S. Pat. No. 5,024,466, issued to Gregory R. Brotz on Jun. 18, 1991, the elbow fitting is formed with an expanded box section at the outer elbow side in which a screen is positioned to engage product particles. The expanded box section is coupled to a vacuum system to hold particles against the screen member to form an accumulation area of product into which the incoming product particles impact. The captured product particles are retained against the screen until worn sufficiently to be replaced by other product particles. While the structure of the Brotz patent provides a layer of product to absorb the impact of incoming product particles and thus reduce wear on the outer side of the elbow, the Brotz apparatus does not contemplate a moving flow of material along the outer elbow side.

Accordingly, it would be desirable to provide an elbow fitting for use in pneumatic conveying or transport systems to improve wear characteristics on the outer elbow side of the fitting and to improve the flow characteristics for product moving through the fitting and that would be operable to affect a clean-out of product particles from the elbow fitting when the flow of particles through the elbow fitting has halted.

SUMMARY OF THE INVENTION

It is an object of this invention to overcome the aforementioned disadvantages of the known prior art by providing an elbow fitting for use in pneumatic conveying systems.

It is another object of this invention to provide a fitting for making directional changes in the flow path of a pneumatic product conveying system.

It is a feature of this invention that the elbow fitting expands along the outer side of the fitting to provide an accumulation layer of product particles.

It is an advantage of this invention that the incoming product particles impact into a slower moving accumulation layer along the outer side of the elbow fitting.

It is still another object of this invention to provide an elbow fitting for use in a dense phase pneumatic conveying system without utilizing a deflector plate for engaging the incoming stream of product particles.

It is yet another object of this invention to provide an elbow fitting that will experience a minimum of wear from engagement with an incoming stream of product particles in a pneumatic conveying system.

It is another advantage of this invention that the impact of incoming product particles is absorbed without causing substantial wear on a structural component of the elbow fitting.

It is another feature of this invention that the accumulation layer of product particles moves along the outer side of the elbow fitting at a slower velocity than the velocity of the incoming particle stream.

It is still another feature of this invention that the moving accumulation layer of product on the outer side of the elbow fitting continually provides a fresh impact zone for incoming product particles.

It is yet another advantage of this invention that product particles in the moving accumulation layer of product is not subjected to excessive wear from impact by incoming particles because of the movement of the accumulation layer, thus minimizing the creation of impact dust in the product stream.

It is yet another feature of this invention that the elbow structure expands along the outer side of the elbow fitting from the inlet pipe and contracts along the outer side of the elbow fitting to the outlet pipe.

It is another feature of this invention that the expansion in depth of the outer side of the elbow fitting is accomplished through the formation of a step forming a sharp drop in the outer surface of the elbow fitting.

It is another advantage of this invention that the step in the outer side of the elbow fitting creates a Bernoulli Effect to cause accumulated product particles to re-enter the air flow stream through the elbow fitting after the incoming flow of product particles has ceased.

It is still another feature of this invention that locating the expansion and contraction of the elbow fitting along the outer side of the fitting provides for the creation of an accumulation layer while permitting the accumulation layer to re-enter the product stream at the outlet pipe.

It is still a further advantage of this invention that the expanded structure of the elbow fitting establishes a slowly moving accumulation layer of product along the outer side of the elbow fitting.

It is still another advantage of this invention that the slowly moving accumulation layer of product minimizes wear on the outer side of the elbow fitting.

It is yet another feature of this invention that the shape of the elbow fitting provides an ideal aerodynamic shape for the flow of air and product through the fitting.

It is yet another advantage of this invention that heat generated from friction along the outer side of the elbow fitting is minimal and eliminates the melting of plastic particles from engagement with the elbow fitting.

It is a further advantage of this invention that the moving accumulation layer of product is uniformly distributed over an expanded triangular fitting configuration to provide a resultant reflective force upwardly toward the outlet pipe at approximately 90 degrees.

It is yet a further feature of this invention that the expanded portion of the elbow fitting forms a triangular shape.

It is still a further advantage of this invention that the elbow fitting provides a directional change for a pneumatic product conveying system with minimum pressure resistance and product attrition.

It is still another advantage of this invention that the reduction in resistance results in lower energy requirement for imposing a change in direction for the flow of product through a pneumatic transport system.

It is still another feature of this invention that the expanded shape for the outer side of the elbow fitting utilizes gravity and Bernoulli's Law to reduce the velocity of the accumulated product layer.

It is yet a further feature of this invention to provide an elbow fitting configuration that can be utilized to create either a 90 degree directional change or a 45 degree direction change for the product stream.

It is yet another advantage of this invention that the step feature of the elbow fitting creates an effective clean-out of the elbow fitting after the incoming product flow has ceased.

It is yet another object of this invention to provide an elbow fitting for pneumatic product conveying systems that is durable in construction, inexpensive of manufacture, carefree of maintenance, facile in assemblage, and simple and effective in use.

These and other objects, features and advantages are accomplished according to the instant invention by providing an elbow fitting for use in a pneumatic product conveying system in which the fitting expands from the inlet pipe along the outer side of the elbow fitting to enable a layer of accumulated product particles to be formed so as to move at a lower velocity than the velocity of the incoming product stream while establishing a moving contact surface for deflecting incoming product particles toward the outlet pipe with a minimum of pressure resistance and product attrition. The accumulated product particles are discharged from the elbow fitting by incorporating a step in the outer surface of the elbow fitting to create a Bernoulli effect causing the accumulated product particles to enter the air flow after the incoming flow of product particles has ceased. The particles in the accumulated layer are replenished from the incoming flow during operation of the elbow fitting.

BRIEF DESCRIPTION OF THE DRAWINGS

The advantages of this invention will be apparent upon consideration of the following detailed disclosure of the invention, especially when taken in conjunction with the accompanying drawings wherein:

FIG. 3 is an elevational view of the elbow fitting depicted in FIG. 1, looking into the outlet portion of the fitting;

FIG. 4 is a side elevational view of the elbow fitting depicted in FIG. 1;

DETAILED DESCRIPTION OF THE PREFERRED EMBODIMENT

Figure 1:
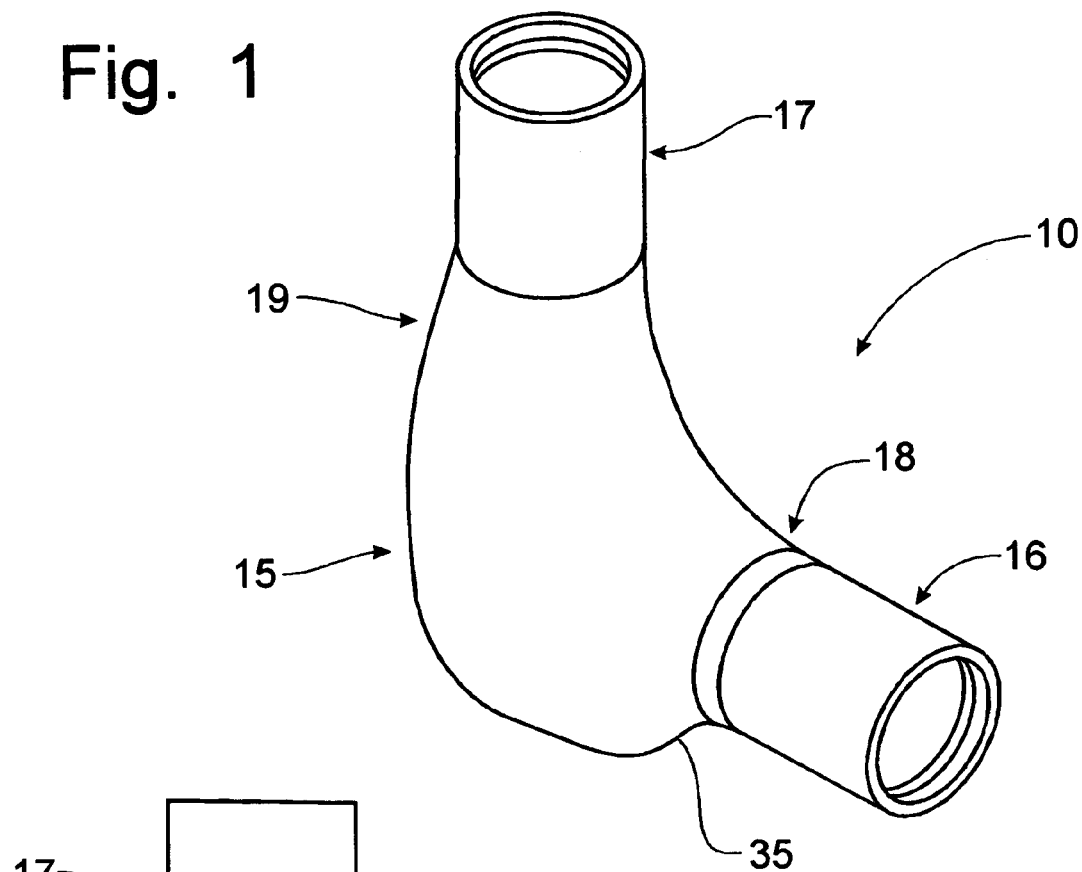
FIG. 1 is a perspective view of a 90 degree elbow fitting having a step feature incorporating the principles of the instant invention.

Referring now to FIGS. 1-5, a 90 degree elbow fitting for use in a pneumatic product conveying system, and incorporating the principles of the instant invention, can best be seen. The elbow fitting 10 is to be connected to a conventional inlet pipe 12 and an outlet pipe 13 to provide a directional change for the path of travel of the product within the pipes 12, 13. While the instant invention is intended for use with dilute phase pneumatic systems, an elbow fitting 10 incorporating the principles of the instant invention can also be utilized with dense phase pneumatic systems. Typically, dense phase pneumatic systems fill the pipe with product particles and inject a sufficient amount of air to effect movement of the product through the pipe 12, 13. Accordingly, a substantial amount of product particles are being moved at a significant velocity through the pipes 12, 13. Changing directions typically results in wear from the product particles rubbing against the inside of the fitting, which also creates heat from friction that can melt plastic particles being conveyed through the pneumatic system.

The elbow fitting 10 is preferably formed from a durable metallic material, such as steel or, preferably, stainless steel, and includes an inlet portion 16 and an outlet portion 17, each of which are sized to mate with the inlet pipe 12 and the outlet pipe 13 in a known manner, such as through a known compression coupling (not shown). Between the inlet portion 16 and the outlet portion 17, the elbow fitting 10 includes an inlet transition section 18 and similar outlet transition section 19 connected, respectively, to the inlet portion 16 and the outlet portion 17. Lastly, a curved expanded section 15 interconnects the inlet and outlet transition sections 18, 19.

Figure 2:
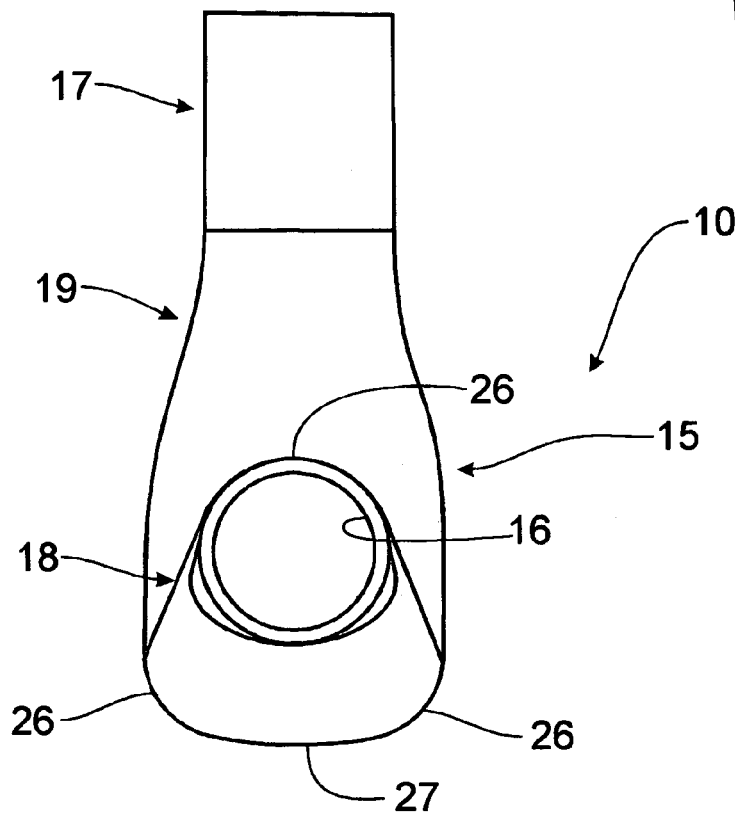
FIG. 2 is an elevational view of the elbow fitting depicted in FIG. 1, looking into the inlet portion of the fitting.
Figure 5:
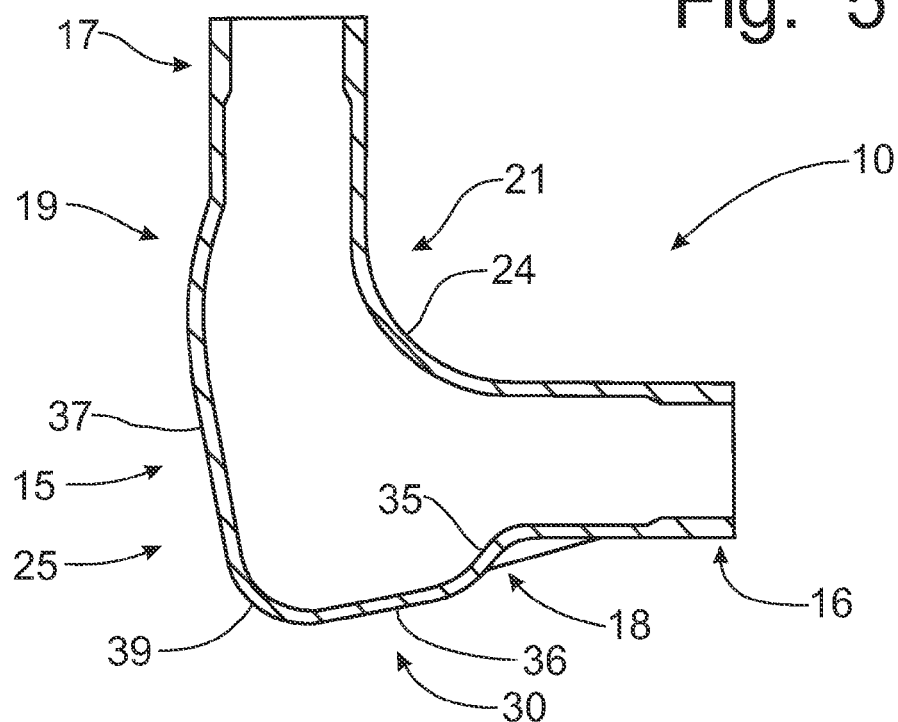
FIG. 5 is a cross-sectional view of the elbow fitting depicted in FIG. 1 taken along the centerline axis of the fitting, corresponding to lines 5-5 of FIG. 3.

The inlet and outlet transition sections 18, 19 transcend between a circular cross-section of the inlet and outlet portions 16, 17 and a generally triangular cross-sectional configuration of the curved expanded portion 15. The triangular shape of the curved expanded portion 15 generally carries through the curved expanded portion 15, except as required to curve from one direction to another at the apex 21 of the curved expanded portion 15. Preferably, the triangular shape of the triangular cross-section of the curved expanded portion 15, as is best seen in FIG. 2, has three curved apexes 26 connected with the adjacent apex 26 by a linear portion, one of which defines a bottom portion 27 having a width greater than the diameter of the inlet and outlet portions 16, 17.

Looking at the cross-sectional view through the centerline axis of the elbow fitting 10, as depicted in FIG. 3, it can be seen that the inner side 21 of the elbow fitting 10 continues linearly from the inlet pipe 12 through a curved area 24 to another linear run to the outlet pipe 13. The outer side 25 of the elbow fitting 10 provides an expanded cross-section area for the elbow fitting 10 by extending downwardly through the inlet transition portion 18 from the inlet portion 16 to the curved expanded portion 15.

The law of gravity and centrifugal force will urge product particles outwardly into this expanded area 30 to provide a slurry layer of accumulated particles along the outer side 25 of the curved expanded portion 15 of the elbow fitting 10. Due to the expanded cross-sectional area of the curved expanded portion 15, Bernoulli's Law requires that the velocity of the product particles will be slowed, as compared to the velocity of the product particles traveling through the circular inlet portion 16. This layer of accumulated particles, represented by dashed line 29, provides a moving impact zone for the incoming particles exiting the inlet portion 16, which can then be deflected upwardly toward the outlet pipe 13 to effect a change of direction for the product being conveyed.

The slowly moving layer 29 of accumulated product particles along the outer side 25 of the curved expanded section 15 also prevents an elevation of the temperature of the fitting 10 that would be normally attributable to friction from the impact of the incoming particles against the outer side of the fitting 10. As a result, the particles will not be damaged by the elevation in temperature.

The curved expanded section 15 is preferably formed with a curved outer side 25, or for the sake of manufacturing convenience may be formed from a pair of linear portions 36, 37 interconnected by a curved portion 39. The linear portions 36, 37 are not perpendicular but are disposed through an angular deflection of approximately 100 degrees, which is at approximately 80 degrees to the line of the incoming product stream through the inlet pipe 12. Since the layer 29 of accumulated product particles along the outer side 25 serves to deflect incoming particles toward the outlet pipe 13, the outer side 25 does not need to function as a deflector plate that needs to be disposed at 55 to 65 degrees with respect to the axis of the inlet pipe 12.

The outlet transition section 19 provides a smooth transition from the triangular shape of the curved expanded portion 15 to the circular shape of the outlet portion 17. Thus, the layer 29 of accumulated product particles is directed back into the outlet pipe 13 to provide a continuous flow of particles through the elbow fitting, including the moving accumulated layer 29 along the outer side 25 of the fitting.

Figure 8:
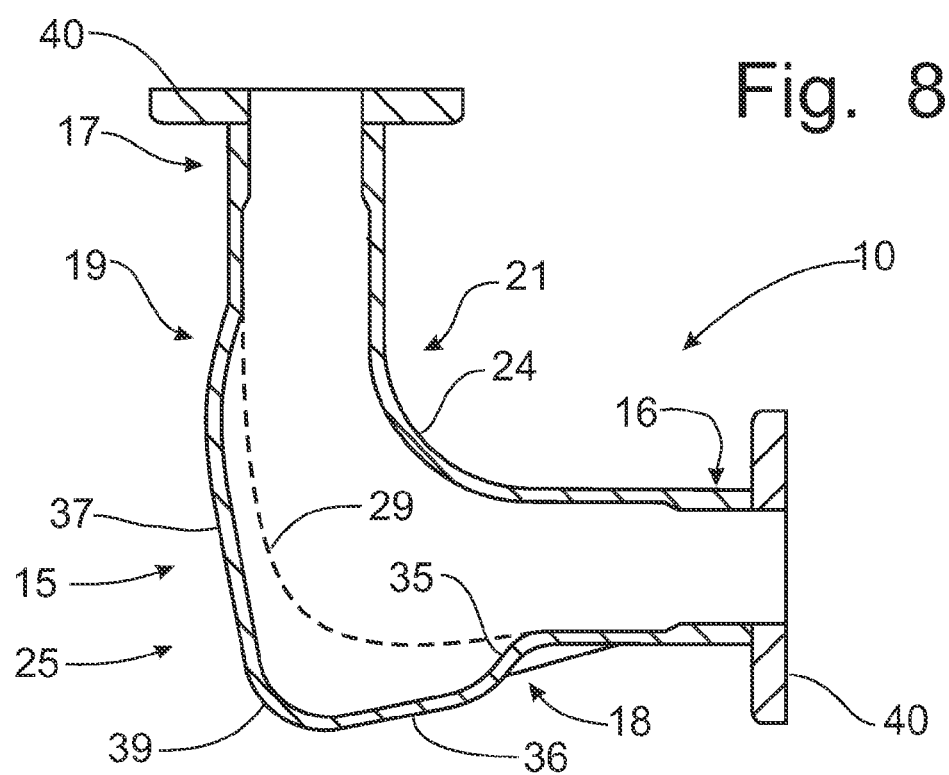
FIG. 8 is a cross-sectional view of the elbow fitting taken along the centerline axis of the fitting, corresponding to lines 8-8 of FIG. 6.
Figure 6:
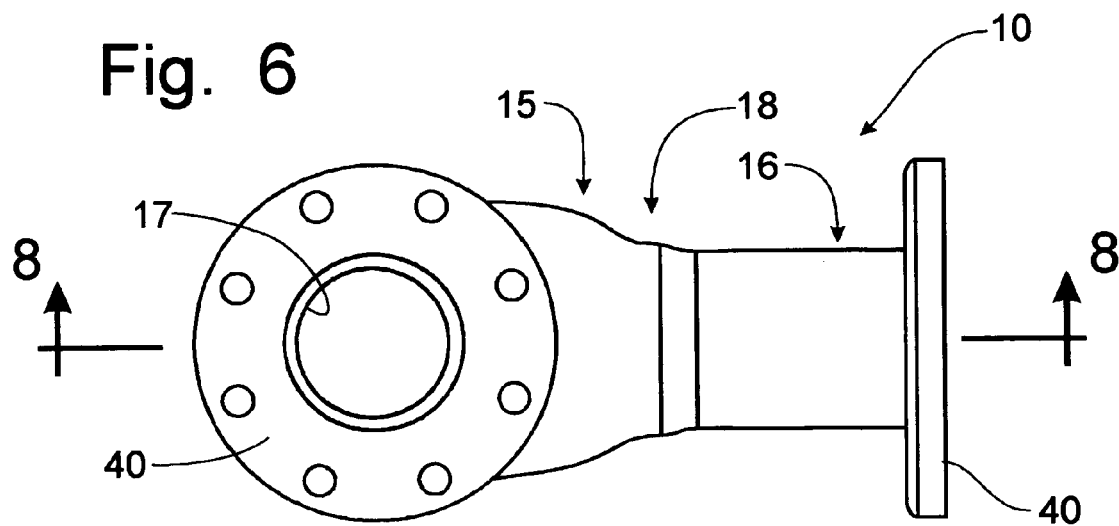
FIG. 6 is an elevational view of an alternative embodiment of the elbow fitting similar to that of FIG. 3, but incorporating an attachment flange for connection of the elbow fitting to an outlet pipe for a pneumatic product conveying system.
Figure 7:
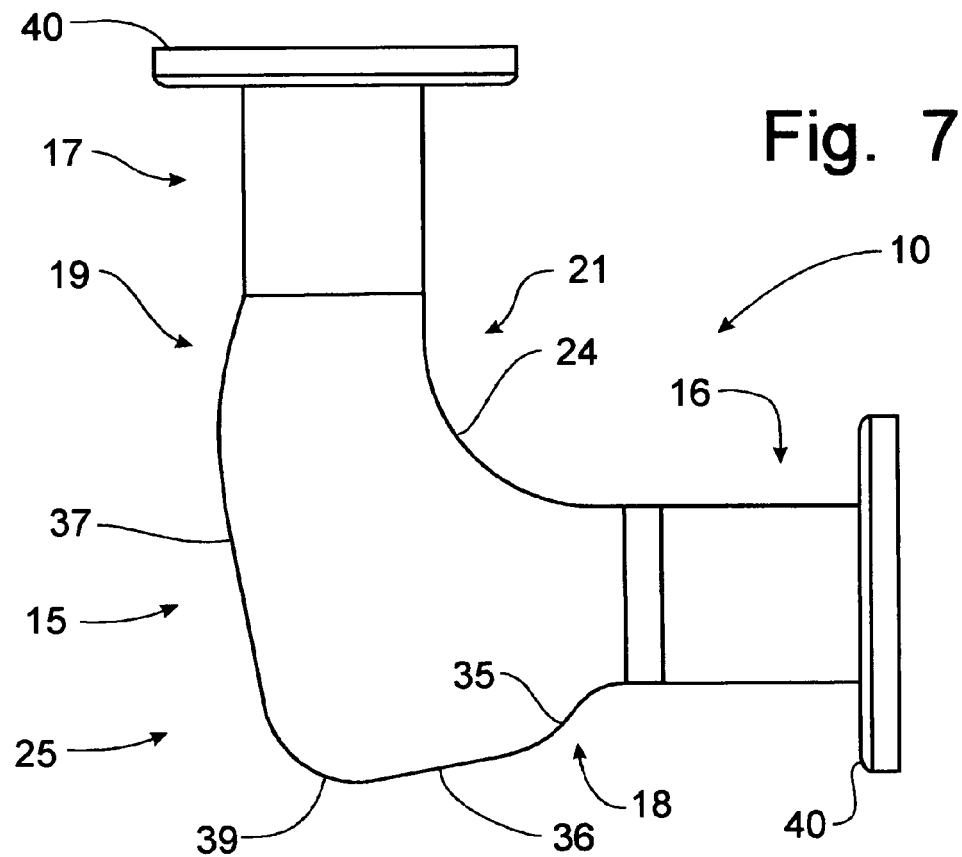
FIG. 7 is a side elevational view of the elbow fitting depicted in FIG. 6.

As can be seen in FIGS. 6-8, this configuration for an elbow fitting can be provided with a conventional mounting flange 40 having a series of apertures for deployment of fasteners for attaching the elbow fitting 10 to the inlet and outlet pipes 12, 13 which are correspondingly equipped. One skilled in the art will also recognize that the elbow fitting can be formed to affect a 45 degree deflection of the product particles, instead of the 90 degree elbow depicted in the drawings.

While the elbow fitting 10 described above is particularly suitable for use in either dense phase or dilute phase pneumatic product transport systems, one skilled in the art will recognize that the same principles for effecting a directional change for slurry product transport systems also apply. The elbow fitting 10 described above provides a lower resistance to effecting directional changes in the flow of product particles through the system. As a result, the energy required to effect directional changes is lower than known long radius elbows. Damage to the product being conveyed due to frictional losses and impact, as is known for long radius elbow fittings, will be significantly reduced. Accordingly, superior results with lower energy costs are associated with the instant invention.

The downward expansion of the outer surface 25 of the elbow fitting 10 is preferably accomplished through a sharp step 35 at the inlet transition portion 18. The step 35 has a slope angle, as is best seen in FIGS. 4 and 7, which is substantially greater than the slope angle of the inlet portion, which is at a nominal zero angle, and the slope angle of the bottom member 27 of the curved expanded portion 15, which is at approximately 10 degrees. The formation of the step 35 creates a Bernoulli effect that allows the layer of accumulated product particles to be formed along the outer surface of the curved expanded portion 15, but creates pressure differentials with the halting of the incoming flow of product particles into the elbow fitting 10 that draw the particles from the accumulated layer 29 into the air flow through the elbow fitting 10. Thus, when the pneumatic conveying system stops conveying product particles, the final flow of air through the system to clean product particles out of the system will effectively clean the particles from the elbow fitting as well.

Without the formation of the step 35, it is believed that the stream of air entering the inlet portion 16 to purge the fitting 10 of remaining product particles would pass over the accumulated solids along the bottom floor 36 of the outer expanded surface 25 and strike the back wall 33 of the fitting 10 causing a high pressure condition on the surface of the accumulated solids, preventing them from purging from the fitting 10.

By modifying the bottom surface 25 of the fitting 10 to extend the bottom inlet portion 16 along the line of the expected accumulated layer 29 while opening the sides of the fitting 10 outwardly to form the curved expanded portion 15 to a point at which the sharp drop or step 35 could be incorporated, the purge air flow was directed upwardly into the main air flow entering the fitting 10 through the inlet 16. The result is a reduction in pressure and the creation of pressure differentials relative to the accumulated particles 29 permitting them to be purged back into the main air flow and discharged from the fitting 10. The incorporation of the sharp drop or step 35 into the bottom surface of the fitting 10 improves purge performance substantially.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. An elbow fitting for use in effecting directional changes from an inlet pipe to an outlet pipe in a pneumatic product conveying system, comprising:
    a circular inlet portion connectable to said inlet pipe to receive a flow of product particles therefrom;
    an inlet transition portion connected to said inlet portion and expanding from a generally circular cross-section into an expanded non-circular cross-section having an outer side width dimension that is greater than a diameter dimension of said inlet portion;
    a curved expanded portion connected to said inlet transition portion and carrying said expanded non-circular cross-section through an angular deflection, said curved expanded portion expanding in depth into a radially outward side of said elbow fitting from said inlet transition portion through a step in said radially outward side of said elbow fitting, said curved expanded portion maintaining a radially inward side of said elbow fitting in a linear relationship with respect to said inlet transition portion and said inlet pipe;
    an outlet transitional portion connected to said curved expanded portion to reduce said expanded non-circular cross-section to said generally circular cross-section; and
    an outlet portion having said circular cross-section and being connected to said outlet transitional portion, said outlet portion also being connectable to said outlet pipe to convey said flow of product particles into said outlet pipe.

2. The elbow fitting of claim 1 wherein said step defines a sharp drop in said radially outward side of said elbow fitting defined by a slope angle substantially greater than a corresponding slope angle of said inlet transition portion and of said curved expanded portion.

3. The elbow fitting of claim 2 wherein said outlet transitional portion has a ramp portion providing a smooth transition in said radially outward side of said elbow fitting from said curved expanded portion to said outlet portion defined by a slope angle that is less than the corresponding slope angle of said step.

4. The elbow fitting of claim 3 wherein said radially inward side of said elbow fitting defines a smooth circular bend from said inlet portion to said outlet portion.

5. The elbow fitting of claim 3 wherein said step provides a Bernoulli effect within said inlet transition portion to affect a pressure differential within said curved expanded portion to cause particles accumulated along said radially outward side of said elbow fitting within said curved expanded portion to be discharged from said elbow fitting when said flow of product particles through said elbow fitting ceases.

6. A method of affecting a directional change in a flow path of product particles flowing in a dilute phase through a pneumatic product conveying system having an inlet pipe, an outlet pipe and an elbow fitting interconnecting said inlet and outlet pipes to provide structure for effecting said directional change, comprising the steps of:
    providing said elbow fitting with an expansion in dimension toward an outer side of said elbow fitting, said expansion of dimension including an increase in depth measured from an inner side of said fitting and an increase in effective width with respect to said inner side, said increase in depth being accomplished through a step defining a slope angle greater than a corresponding slope angle in said elbow fitting on opposing upstream and downstream sides of said step;
    establishing a layer of accumulated product particles in a dense phase along an inner surface of said outer side of said elbow fitting, said layer of accumulated product particles moving toward said outlet pipe at a velocity slower than a velocity of incoming product particles moving from said inlet pipe into said elbow fitting;

deflecting said incoming product particles off said layer of accumulated product particles to affect a change of direction of said incoming product particles toward said outlet pipe;

discharging said product particles through said outlet pipe in a dilute phase; and affecting a clean-out of said elbow fitting when said incoming flow of product particles ceases by utilizing pressure differentials caused by said step to urge said accumulated particles into an air flow path through said elbow fitting.

7. The method of claim 6 wherein said step creates a Bernoulli effect to cause said accumulated particles in said dense phase along said inner surface of said outer side of said elbow fitting to re-enter said air flow path through said elbow fitting after said incoming flow of product particles ceases.

8. The method of claim 7 wherein said affecting step is accomplished only when said incoming flow of product particles ceases causing said accumulated product particles in said dense phase during said establishing step to be discharged from said elbow fitting.

9. The method of claim 7 wherein said layer of accumulated product particles in said dense phase replenishes from said incoming flow of product particles as product particles from said accumulated layer enters the air flow through said elbow fitting near said outlet pipe.

10. A method of affecting a clean-out of product particles in an elbow fitting affecting a directional change in a flow path of product particles flowing in a dilute phase through a pneumatic product conveying system having an inlet pipe, an outlet pipe with said elbow fitting interconnecting said inlet and outlet pipes to provide structure for effecting said directional change, said elbow fitting having an expansion in dimension toward an outer side of said elbow fitting to permit an accumulation of a layer of product particles in a dense phase along an inner surface of said outer side of said elbow fitting such that said layer of accumulated product particles moves toward said outlet pipe at a velocity slower than a velocity of incoming product particles moving from said inlet pipe into said elbow fitting, comprising the steps of:

forming said elbow fitting with a step establishing said expansion in dimension toward an outer side of said elbow fitting, said step defining a slope angle greater than a corresponding slope angle in said elbow fitting on opposing upstream and downstream sides of said step; and utilizing a Bernoulli effect created by said step to affect a clean-out of said elbow fitting when said incoming flow of product particles ceases through pressure differentials caused by air flow passing over said step to urge said accumulated particles into said air flow path through said elbow fitting.

11. The method of claim 10 wherein said affecting step is accomplished only when said incoming flow of product particles ceases causing said accumulated product particles in said dense phase during said establishing step to be discharged from said elbow fitting.

12. The method of claim 11 wherein said elbow fitting deflects said incoming product particles off said layer of accumulated product particles to affect a change of direction of said incoming product particles toward said outlet pipe.

13. The method of claim 12 wherein said elbow fitting discharges said product particles through said outlet pipe in a dilute phase after being deflected off said layer of accumulated product particles.

14. The method of claim 13 wherein said layer of accumulated product particles in said dense phase replenishes from said incoming flow of product particles as product particles from said accumulated layer enters the air flow through said elbow fitting near said outlet pipe.

* * * * *